US012227193B2

(12) United States Patent
Sano et al.

(10) Patent No.: US 12,227,193 B2
(45) Date of Patent: *Feb. 18, 2025

(54) DRIVER ASSISTANCE SYSTEM AND DRIVER ASSISTANCE METHOD (71) Applicant: TOYOTA JIDOSHA KABUSHIKI KAISHA, Toyota (JP)

(72) Inventors: Masataka Sano, Tokyo-to (JP); Koichiro Yamauchi, Tokyo-to (JP); Takuya Sakata, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/544,749

(22) Filed: Dec. 19, 2023

(65) Prior Publication Data

US 2024/0123998 A1 Apr. 18, 2024

Related U.S. Application Data (63) Continuation of application No. 17/350,055, filed on Jun. 17, 2021, now Pat. No. 11,897,481.

(30) Foreign Application Priority Data

Jul. 1, 2020 (JP) ................. 2020-114150

(51) Int. Cl.
*B60W 40/09* (2012.01)
*B60W 40/04* (2006.01)
(Continued)

(52) U.S. Cl.
CPC ............ *B60W 40/09* (2013.01); *B60W 40/04* (2013.01); *B60W 50/16* (2013.01);
(Continued)

(58) Field of Classification Search
CPC ...... B60W 40/09; B60W 40/04; B60W 50/16; B60W 2050/146; B60W 2540/21;
(Continued)

(56) References Cited

U.S. PATENT DOCUMENTS 8,849,494 B1 * 9/2014 Herbach .............. G05D 1/0044
701/24
10,647,333 B1 5/2020 Donnelly et al.
(Continued)

FOREIGN PATENT DOCUMENTS

JP 2009-048605 A 3/2009
JP 2014215265 A 11/2014
(Continued)

OTHER PUBLICATIONS

Masataka Sano et al., U.S. Appl. No. 17/350,055, Non-Final Office Action dated Jun. 9, 2023.
(Continued)

*Primary Examiner* — Jason Holloway
*Assistant Examiner* — Madison B Emmett
(74) *Attorney, Agent, or Firm* — Dickinson Wright, PLLC (57) ABSTRACT

The driver assistance system comprises a detector, a navigator, a stimulator, and a voice interactor. The detector detects wakefulness reduction of a driver or absent-minded driving by the driver. The navigator navigates a vehicle based on map information. The stimulator continuously or intermittently applies stimulation to the driver. The voice interactor interacts with the driver by voice. The navigator searches for a resting facility on a route from the map information in response to a detection of the wakefulness reduction or the absent-minded driving. The voice interactor executes a first interaction of proposing navigation to the resting facility by the navigator in response to the detection of the wakefulness reduction or the absent-minded driving, (Continued)

and executes a second interaction of proposing application of stimulation by the stimulator after an execution of the first interaction and during a period until the vehicle arrives at the resting facility.

4 Claims, 7 Drawing Sheets

(51) Int. Cl.
    *B60W 50/14*     (2020.01)
    *B60W 50/16*     (2020.01)
    *G01C 21/36*     (2006.01)

(52) U.S. Cl.
    CPC ..... *G01C 21/3679* (2013.01); *G01C 21/3697* (2013.01); *B60W 2050/146* (2013.01); *B60W 2540/21* (2020.02); *B60W 2540/229* (2020.02)

(58) Field of Classification Search
    CPC ... B60W 2540/229; B60W 2040/0827; B60W 40/08; B60W 50/14; G01C 21/3679; G01C 21/3697; G01C 21/3617; G01C 21/3415
    See application file for complete search history.

(56) References Cited

U.S. PATENT DOCUMENTS

| | | | |
|---|---|---|---|
| 11,100,797 B2* | 8/2021 | McGavran | G01C 21/3415 |
| 2012/0078509 A1 | 3/2012 | Choi | |
| 2015/0081169 A1* | 3/2015 | Pisz | G06F 21/31 701/1 |
| 2015/0239477 A1 | 8/2015 | Kitagawa | |
| 2015/0347075 A1* | 12/2015 | Levesque | G06F 3/016 345/3.1 |
| 2016/0046294 A1 | 2/2016 | Lee et al. | |
| 2016/0358468 A1 | 12/2016 | McGavran et al. | |
| 2017/0308083 A1* | 10/2017 | Sato | B60Q 9/00 |
| 2018/0060660 A1* | 3/2018 | Sun | G01J 3/46 |
| 2018/0340785 A1* | 11/2018 | Upadhyay | F01N 9/002 |
| 2019/0276047 A1 | 9/2019 | Suzuki et al. | |
| 2019/0295400 A1* | 9/2019 | Yamaguchi | B60R 21/00 |
| 2022/0297644 A1* | 9/2022 | Rho | G08G 1/0137 |

FOREIGN PATENT DOCUMENTS

| | | |
|---|---|---|
| JP | 2015-162087 A | 9/2015 |
| JP | 2019008468 A | 1/2019 |
| JP | 2019-036018 A | 3/2019 |
| JP | 2019-159711 A | 9/2019 |

OTHER PUBLICATIONS

Masataka Sano et al., U.S. Appl. No. 17/350,055, Notice of Allowance dated Oct. 5, 2023.

* cited by examiner

DRIVER ASSISTANCE SYSTEM AND DRIVER ASSISTANCE METHOD

CROSS-REFERENCE TO RELATED APPLICATION

The present application is a continuation of U.S. patent application Ser. No. 17/350,055, filed Jun. 17, 2021, which claims priority under 35 U.S.C. § 119 to Japanese Patent Application No. 2020-114150, filed Jul. 1, 2020, the contents of which are incorporated herein by reference in their entirety.

BACKGROUND

Field

The present disclosure relates to a technique to assist a driver so that the driver can maintain driving in a suitable state.

Background Art

Patent Document 1 discloses a conventional technique for maintaining wakefulness of a driver by generating awakening stimulation. In this conventional technique, when a notice for calling attention or presenting information is given to the driver, the mode of generating awakening stimulation is changed in synchronization with the start of the notice. As a result, even when the awakening stimulation is continued, the driver can easily pay attention to the awakening stimulation, and the driver is suppressed from becoming accustomed to the awakening stimulation.

However, when the wakefulness of the driver has reduced or when the driver is in an absent-minded driving state, it is not always possible to maintain a state suitable for driving by merely applying stimulation. Further, in order to return the driver whose wakefulness has reduced or the driver who is in the absent-minded driving state to the state suitable for driving, it may be more important to reliably take a break than to forcibly continue driving by applying stimulation.

SUMMARY

The present disclosure has been made in view of the above-mentioned problems, and an object thereof is to provide a technique to return a driver whose wakefulness has reduced during driving or a driver who is in an absent-minded driving state to a state suitable for driving.

The driver assistance system according to the present disclosure includes a detector, a navigator, a stimulator, and a voice interactor. The detector is a device to detect wakefulness reduction of a driver or absent-minded driving by the driver. The navigator is a device to navigate a vehicle based on map information. The stimulator is a device to continuously or intermittently apply stimulation to the driver. The stimulation that the stimulator applies to the driver may be, for example, vibration stimulation or informational stimulation. Further, the stimulator may apply a plurality of types of stimulation to the driver. A voice interactor is a device to interact with the driver by voice.

In response to a detection of the wakefulness reduction or the absent-minded driving by the detector, the navigator searches for a resting facility on a route from the map information, and the voice interactor executes a first interaction of proposing navigation to the resting facility by the navigator. If the vehicle is an autonomous driving vehicle, the vehicle may autonomously travel to the resting facility according to the navigation by the navigator.

The voice interactor also executes a second interaction of proposing application of stimulation by the stimulator after an execution of the first interaction and during a period until the vehicle arrives at the resting facility. In the second interaction by the voice interactor, it is allowed to propose application of a plurality of types of stimulation to the driver.

If it is expected that it takes time for the vehicle to arrive at the resting facility, the execution of the first interaction may be stopped and the second interaction may be executed. If the vehicle is caught in a traffic jam, the execution of the first interaction may be stopped and the second interaction may be executed. In other words, when it is difficult for the driver to take a break at the resting facility, as a next best measure, it is allowed to propose the driver only to continuously or intermittently apply stimulation.

In another embodiment of the driver assistance system according to the present disclosure, when the wakefulness reduction of the driver or the absent-minded driving by the driver is detected by the detector, the navigator searches for the resting facility on the route from the map information, and navigates the vehicle to the resting facility. Then, until the vehicle arrives at the resting facility, the stimulator continuously or intermittently applies stimulation to the driver.

The driver assistance method according to the present disclosure is a method including first to sixth steps. In a first step, wakefulness reduction of a driver or absent-minded driving by the driver is detected.

In a second step, when the wakefulness reduction or the absent-minded driving is detected in the first step, a resting facility on a route is searched from map information.

In a third step, navigation to the resting facility searched in the second step is proposed to the driver by a first interaction.

In a fourth step, the vehicle is navigated to the resting facility in response to an agreement by the driver in the third step to a proposal through the first interaction. If the vehicle is an autonomous driving vehicle, the vehicle may autonomously travel to the resting facility according to navigation.

In a fifth step, after the navigation of the vehicle to the resting facility is initiated in the fourth step, the application of stimulation to the driver is proposed to the driver through a second interaction.

In a sixth step, the stimulation is continuously or intermittently applied to the driver until the vehicle arrives at the resting facility in response to an agreement by the driver in the fifth step to a proposal through the second interaction. The stimulation applied to the driver may be, for example, vibration stimulation or informational simulation. In addition, a plurality of types of stimulation may be applied to the driver.

According to the present disclosure, when the wakefulness reduction of the driver or the absent-minded driving by the driver is detected, a resting facility on the route is searched from the map information, and the navigation of the vehicle to the searched resting facility is proposed. At the same time, it is also proposed to continuously or intermittently apply stimulation to the driver until the vehicle arrives at the resting facility. As a result, the driver can be navigated to the resting facility while being prompted to wake up by the stimulation. According to the present disclosure, it is possible to make the driver whose wakefulness has reduced during driving or the driver who is in the absent-minded driving state take a break, and to return the driver to the state suitable for driving.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. Outline of Driver Assistance System

The driver assistance system according to the embodiment of the present disclosure is a system to assist a driver so that the driver can maintain driving in a suitable state. The vehicle on which the driver assistance system according to the present embodiment is mounted is an autonomous driving vehicle. In the autonomous driving vehicle, the recognition, prediction, judgment, and operation which the driver took in the conventional vehicle are carried out by the autonomous driving system.

However, it is sometimes impossible to continue the autonomous driving by the autonomous driving system due to various causes such as a running environment and an abnormality of the system. In such a case, the driver must immediately return to a normal driving state. Therefore, even during autonomous driving, the driver is not allowed to sleep, and the driver should be prevented from absent-minded driving. The driver assistance system according to the present embodiment is a driver assistance system having a function of causing the driver whose wakefulness has reduced during traveling by the autonomous driving vehicle and the driver who is in an absent-minded driving state to return to a state suitable for driving.

Figure 1:
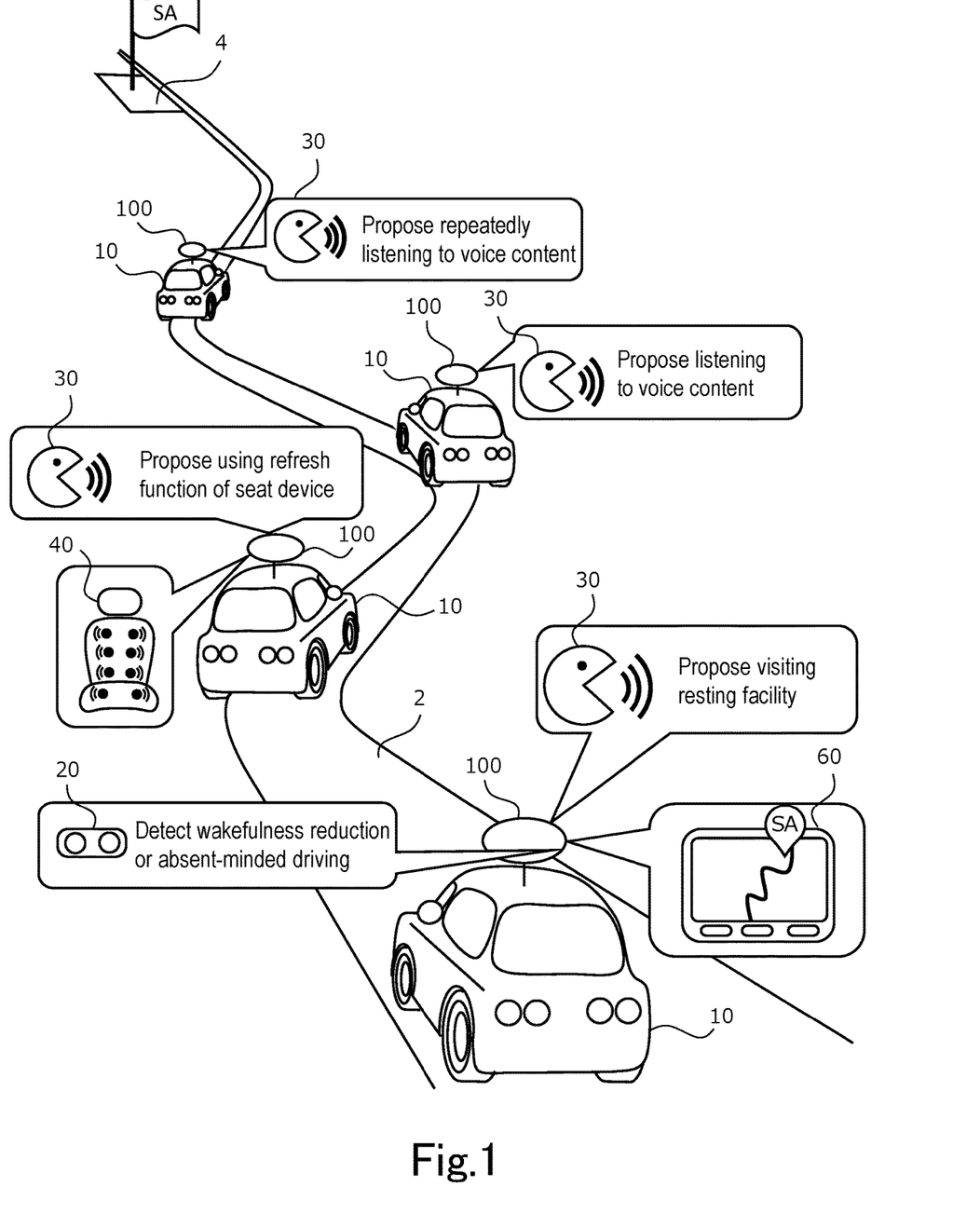
FIG. 1 is a diagram illustrating an outline of a driver assistance system according to an embodiment of the present disclosure.

Hereinafter, an outline of the driver assistance system according to the present embodiment will be described with reference to FIG. 1. In FIG. 1, the vehicle 10 traveling on a road 2 is an autonomous driving vehicle on which the driver assistance system 100 according to the present embodiment is mounted. The road 2 is the running route of the autonomous driving vehicle to the set destination. During autonomous driving, the driver assistance system 100 is monitoring the state of the driver by a driver monitor 20. The driver monitor 20 is a camera mounted in the cabin to monitor the driver's face information. The information obtained by the monitoring is used for the detection of the wakefulness reduction of the driver and the absent-minded driving by the driver. The detailed detection method will be described later.

When the wakefulness reduction of the driver or the absent-minded driving by the driver is detected, the driver is preferentially navigated to a resting facility by the driver assistance system 100. The resting facility is a facility that is located on a highway or arterial road and can be visited by a vehicle, and the driver can stop the vehicle and take a rest. In the case of Japan, for example, a service area (SA) and a parking area (PA) are examples of the resting facility. When the wakefulness has reduced or when the driver is in the absent-minded driving state, if the driver can rest at the resting facility, the driver can be returned to the state suitable for driving.

The driver assistance system 100 uses a navigator 60 to search for the resting facility on the driving route from the map information. The resting facilities searched by the navigator 60 include a service area (SA) and a parking area (PA) located on the highway. In the exemplary embodiment shown in FIG. 1, there is a service area 4 on the road ahead of the vehicle 10. The driver assistance device 100 proposes to visit the service area 4 to the driver by an HMI (Human Machine Interface) unit 30 which is capable of voice interaction with the driver. The proposal is made in voice interaction (first interaction). If the driver accepts the proposal, the navigator 60 adds the service area 4 to en-route points. The vehicle 10 automatically travels to the service area 4 in accordance with the navigation by the navigator 60.

While the vehicle 10 is traveling automatically to the service area 4, the driver assistance system 100 proposes the use of the refresh function of a seat device 40 to the driver by the HMI unit 30. The proposal is made in voice interaction (second interaction). The refresh function of the seat device 40 is a function of expanding air bladders in the seat back and the seat cushion to press from the back to the thighs of the driver, thereby contributing to refreshing the mind and body of the driver. When the driver approves the proposal, the driver assistance system 100 activates the refresh function of the seat device 40 to apply vibration stimulation to the driver. By using the refresh function of the seat device 40, the driver can receive vibration stimulation, and can maintain the wakefulness and the attention by the effect of the vibration stimulation. The operation of the refresh function of the seat device 40 may be continuous or intermittent.

After proposing the use of the refresh function of the seat device 40, the driver assistance system 100 proposes to the driver to listen to a voice content including news and trivia using the HMI unit 30. The proposal is made in voice interaction (second interaction). The voice content is retrieved from a content server on the Internet. When the driver approves the proposal, the driver assistance system 100 applies informational stimulation to the driver by providing the voice content from the speaker of the HMI unit 30. By listening to the voice content such as news or trivia, the driver can receive informational stimulation and can maintain the wakefulness and the attention by the effect of the informational stimulation.

Proposals to the driver to listen to the voice content including news and trivia are repeatedly made by the HMI unit 30 until the vehicle 10 arrives at the service area 4. The voice interaction itself stimulates the driver and has the effect of maintaining the wakefulness of the driver. By repeating the interactive proposal by voice and repeating informational stimulation using the voice content, the wakefulness and the attention of the driver are maintained until the vehicle 10 arrives at the service area 4.

The outline of the driver assistance system 100 has been described above. According to the driver assistance system 100, the driver whose wakefulness has reduced during driving or the driver who is in the absent-minded driving state is navigated to the service area 4 by autonomous driving of the vehicle 10 while being awakened by a plurality of types of stimulation that are continuously or intermittently applied. This allows the driver to take a break at the service area 4 to return the driver to the state suitable for driving. Hereinafter, the configuration and processing of the driver assistance system 100 will be described in detail.

2. Configuration of Driver Assistance System

Figure 2:
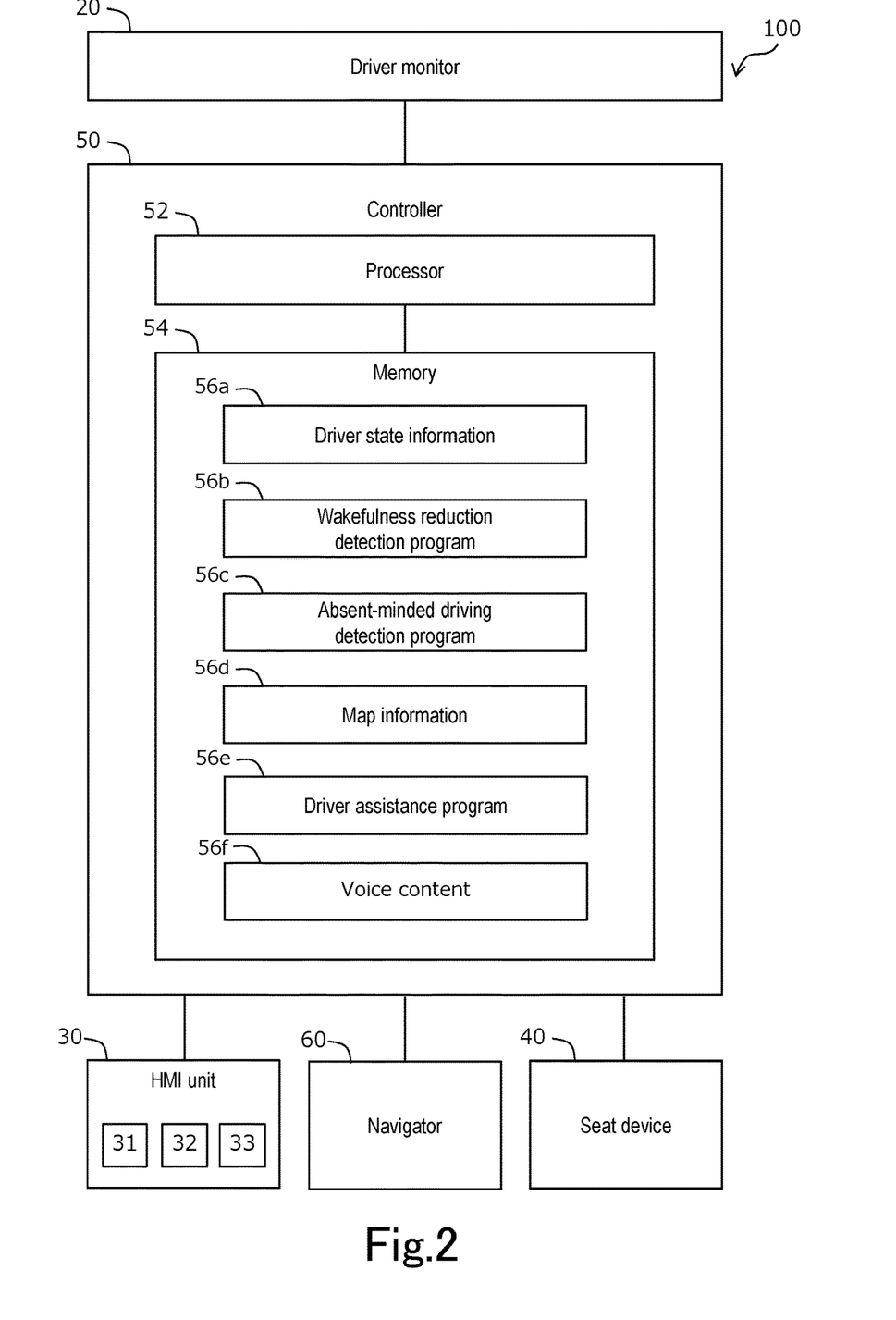
FIG. 2 is a block diagram showing a configuration of the driver assistance system according to the present embodiment.

FIG. 2 is a block diagram showing a configuration of the driver assistance system 100. The driver assistance system 100 comprises the driver monitor 20, the HMI unit 30, the seat device 40, the navigator 60, and a controller 50. The controller 50, the driver monitor 20, the HMI unit 30, the seat device 40, and the navigator 60 are connected by in-vehicle networks such as CAN (Controller Area Network). The controller 50 is also connected by in-vehicle networks with various sensors and actuators necessary for autonomous driving.

The controller 50 is an ECU (Electronic Control Unit) including at least one processor 52 and at least one memory 54. Various programs and data are stored in the memory 54. The memory 54 may include, in addition to a narrowly defined memory such as a RAM (Random Access Memory), a data storage device such as a magnetic disk such as an HDD, an optical disk such as a DVD, or a flash memory storage device such as an SSD. The memory 54 stores, as data, at least driver state information 56a, map information 56d, and a voice content 56f. The memory 54 stores, as programs, at least a wakefulness reduction detection program 56b, an absent-minded driving detection program 56c, and a driver assistance program 56e. These programs stored in the memory 54 are executed by the processor 52.

The driver monitor 20 is mounted in a place in front of the driver's seat where the driver's face can be photographed, for example, in the vicinity of an upper portion of a steering column or an in-vehicle rear view mirror. The driver monitor 20 constantly monitors the facial expression of the driver, and stores the acquired data in the memory 54 of the controller 50. The data acquired by the driver monitor 20 is stored in the memory 54 as driver state information 56a. As described later, the driver state information 56a is used for the detection of the wakefulness reduction by the wakefulness reduction detection program 56b and the detection of the absent-minded driving by the absent-minded driving detection program 56c. That is, the driver monitor 20 functions as a detector together with the controller 50.

The HMI unit 30 includes a speaker 31 as a voice output unit and a microphone 32 as a voice input unit. The HMI unit 30 functions as a voice interactor that interacts with the driver using the speaker 31 and the microphone 32. The HMI unit 30 also functions as a stimulator that applies stimulation to the driver by the voice content played from the speaker 31. The voice content 56f stored in the memory 54 of the controller 50 is played from the speaker 31. The controller 50 connects to the Internet by wireless communication, acquires the voice content 56f from a content server on the Internet, and temporarily stores it in the memory 54. The voice content 56f includes, for example, news, trivia, destination weather, and the like.

The HMI unit 30 includes a HUD (Head Up Display) 33 which is a visual display. The HMI unit 30 projects various information about the vehicle 10, such as vehicle speed, fuel economy, alarms, etc., from the HUD 33 to a front glass of the vehicle 10. The HMI unit 30 can also flash the HUD 33. By flashing the HUD 33, visual stimulation can be applied to the driver.

The seat device 40 is installed in the driver's seat on which the driver sits. As described above, the seat device 40 has the refresh function. The seat device 40 functions as a stimulator that applies vibration stimulation to the driver using the refresh function. The seat device 40 is also provided with a function of vibrating a seat belt. Vibrating the seat belt applies stimulation to the driver. That is, the seat device 40 also functions as a stimulator that applies stimulation to the driver by the vibration of the seat belt.

The navigator 60 specifies the current position of the vehicle 10 on the map using the map information 56d stored in the memory 54 of the controller 50 and the position information acquired by GPS. When the destination is set on the map, the navigator 60 sets a travel route to the destination and navigates the vehicle 10 to the destination. Since the vehicle 10 is an autonomous driving vehicle, the controller 50 causes the vehicle 10 travel autonomously to the destination according to the navigation by the navigator 60. The map information 56d also includes information on the location of resting facilities such as a service area and a parking area. When a resting facility is added to en-route points, a new driving route is set to go to the destination after visiting the resting facility. The map information 56d can also be acquired from a server on the Internet.

3. Detection of Wakefulness Reduction

The detection of the wakefulness reduction of the driver by the driver assistance system 100 is realized by executing the wakefulness reduction detection program 56b by the processor 52. Hereinafter, a method of detecting the wakefulness reduction by the wakefulness reduction detection program 56b will be described with reference to FIGS. 3 and 4.

Figure 3:
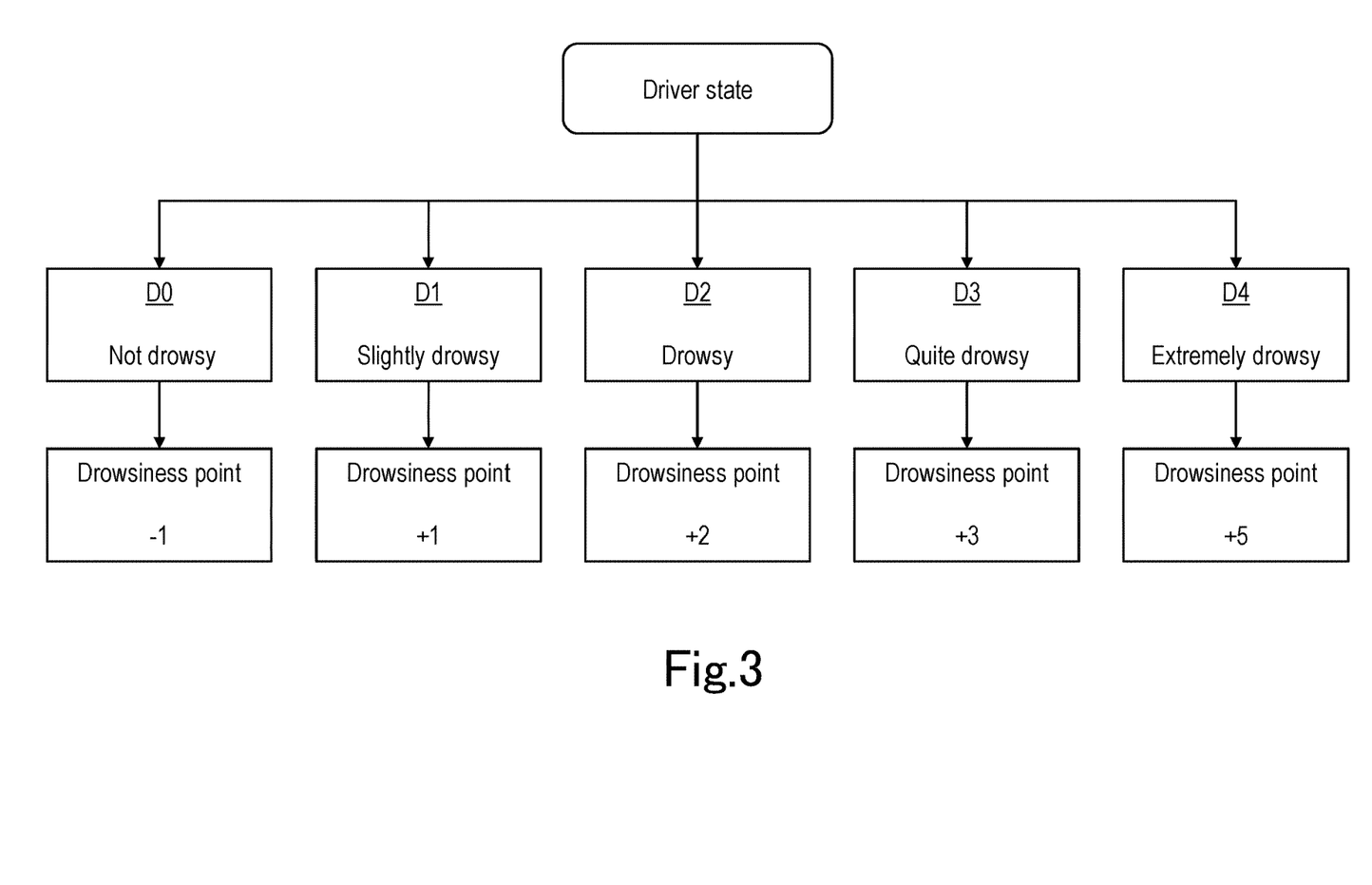
FIG. 3 is a diagram illustrating a method of detecting wakefulness reduction.
Figure 4:
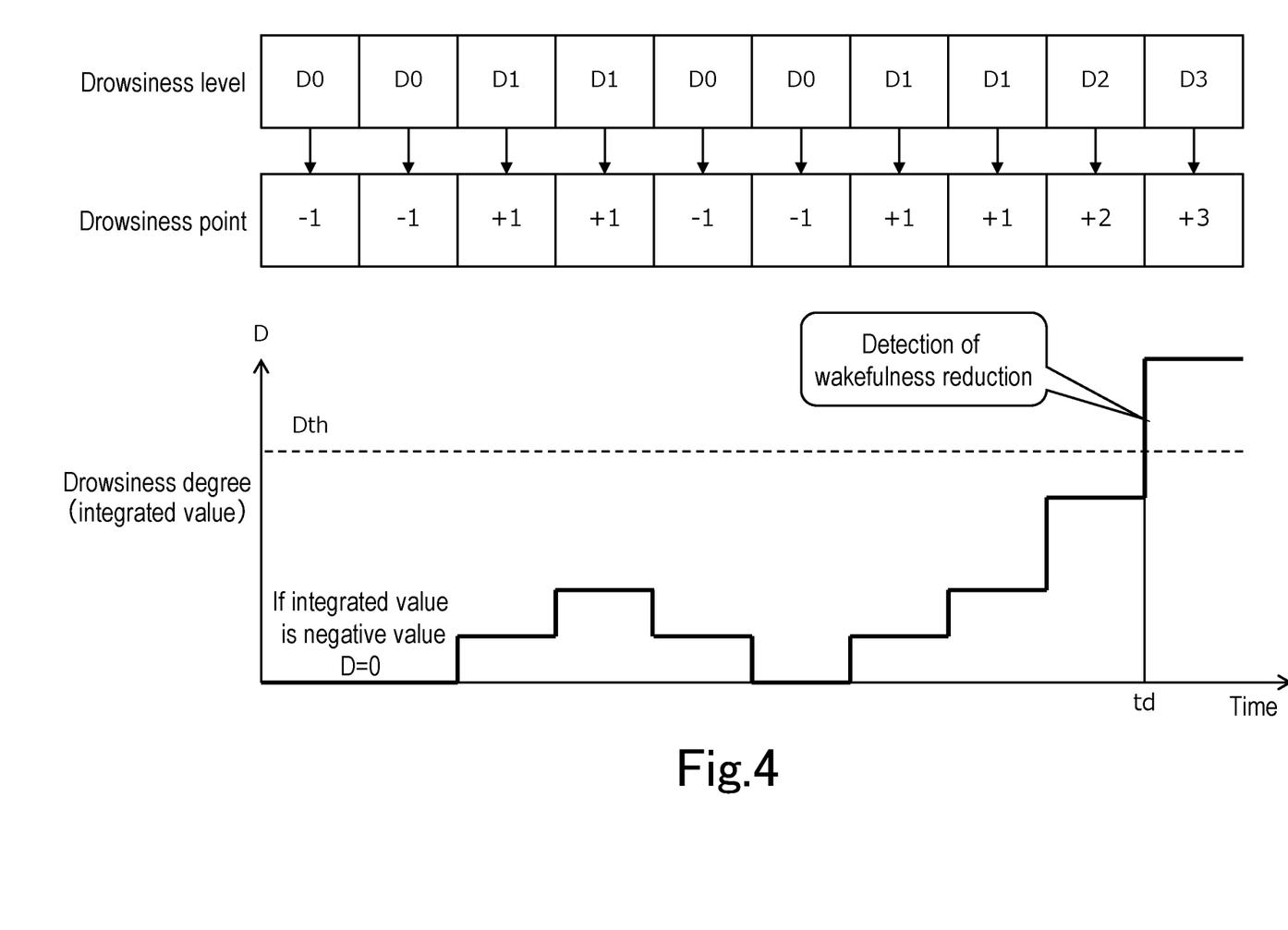
FIG. 4 is a diagram illustrating a method of detecting wakefulness reduction.

The wakefulness reduction detection program 56b processes the driver state information 56a acquired by the driver monitor 20. The driver status information 56a includes face information of the driver monitored by the driver monitor 20. Among the face information of the driver, the information mainly used in the wakefulness reduction detection program 56b is information on a face orientation, a face position, an eye opening degree, an aperture degree, and a visual line of sight. The wakefulness reduction detection program 56b determines the level of drowsiness from these pieces of information.

First, the level of drowsiness will be described with reference to FIG. 3. In the wakefulness reduction detection program 56b, as shown in FIG. 3, the level of drowsiness is divided into five levels from D0 to D4. D0 is a level that the driver appears not to be drowsy at all, D1 is a level that the driver appears to be slightly drowsy, D2 is a level that the driver appears to be drowsy, D3 is a level that the driver appears to be quite drowsy, and D4 is a level that the driver appears to be extremely drowsy.

The wakefulness reduction detection program 56b determines the level of drowsiness of the driver at the present time from the driver state information 56a. When a conversation is established between the driver and the HMI unit 30, or when the driver can check the surroundings, the level of drowsiness is determined to be D0. When the speed of blinking is decreasing or when the driver blinks irregularly, the level of drowsiness is determined to be D1. When blinking is slow and frequent, when the driver is moving his head, or when the eyelids are slightly heavier, the level of drowsiness is determined to be D2. When the driver is in half eyes, when the driver has a long yawn, when the eyelids are heavy, or when closed eyes are detected, the level of drowsiness is determined to be D3. Then, when eye closure for a predetermined time or longer is detected, the level of drowsiness is determined to be D4.

In the wakefulness reduction detection program 56b, a drowsiness point is set for each level. Specifically, a drowsiness point of −1 is set for D0. A drowsiness point of +1 is set for D 1. A drowsiness point of +2 is set for D2. A drowsiness point of +3 is set for D3. A drowsiness point of +5 is set for D4. That is, the higher the level of drowsiness, the greater the value of the drowsiness point is set.

Next, a method of detecting the wakefulness reduction based on the level of drowsiness will be described with reference to FIG. 4. The wakefulness reduction detection program 56b determines the level of drowsiness in a constant cycle, for example, about 10 seconds, and calculates the drowsiness point from the level of drowsiness. The wakefulness reduction detection program 56b successively integrates the drowsiness points calculated at the constant cycle, and calculates the integrated value as a drowsiness degree D. The drowsiness degree D is a parameter representing the intensity of drowsiness of the driver. However, when the result of integrating the drowsiness points becomes a negative value, the drowsiness degree D is set to zero.

A threshold Dth is set for the drowsiness degree D. When the drowsiness degree D is equal to or greater than the threshold Dth, the wakefulness reduction detection program 56b determines that the wakefulness reduction of the driver has been detected. That is, the wakefulness reduction detection program 56b comprehensively determines the wakefulness reduction from the transition of the drowsiness level. The value of the threshold Dth can be arbitrarily set. However, in order to increase the certainty of the prevention of the drowsy driving, it is preferable that the threshold Dth is a value smaller than the drowsiness point of the maximum drowsiness level D4.

4. Detection of Absent-Minded Driving

Detection of the absent-minded driving by the driver assistance system 100 is realized by executing the absent-minded driving detection program 56c by the processor 52.

Hereinafter, with reference to FIG. 5, a method of detecting the absent-minded driving by the absent-minded driving detection program 56c.

Figure 5:
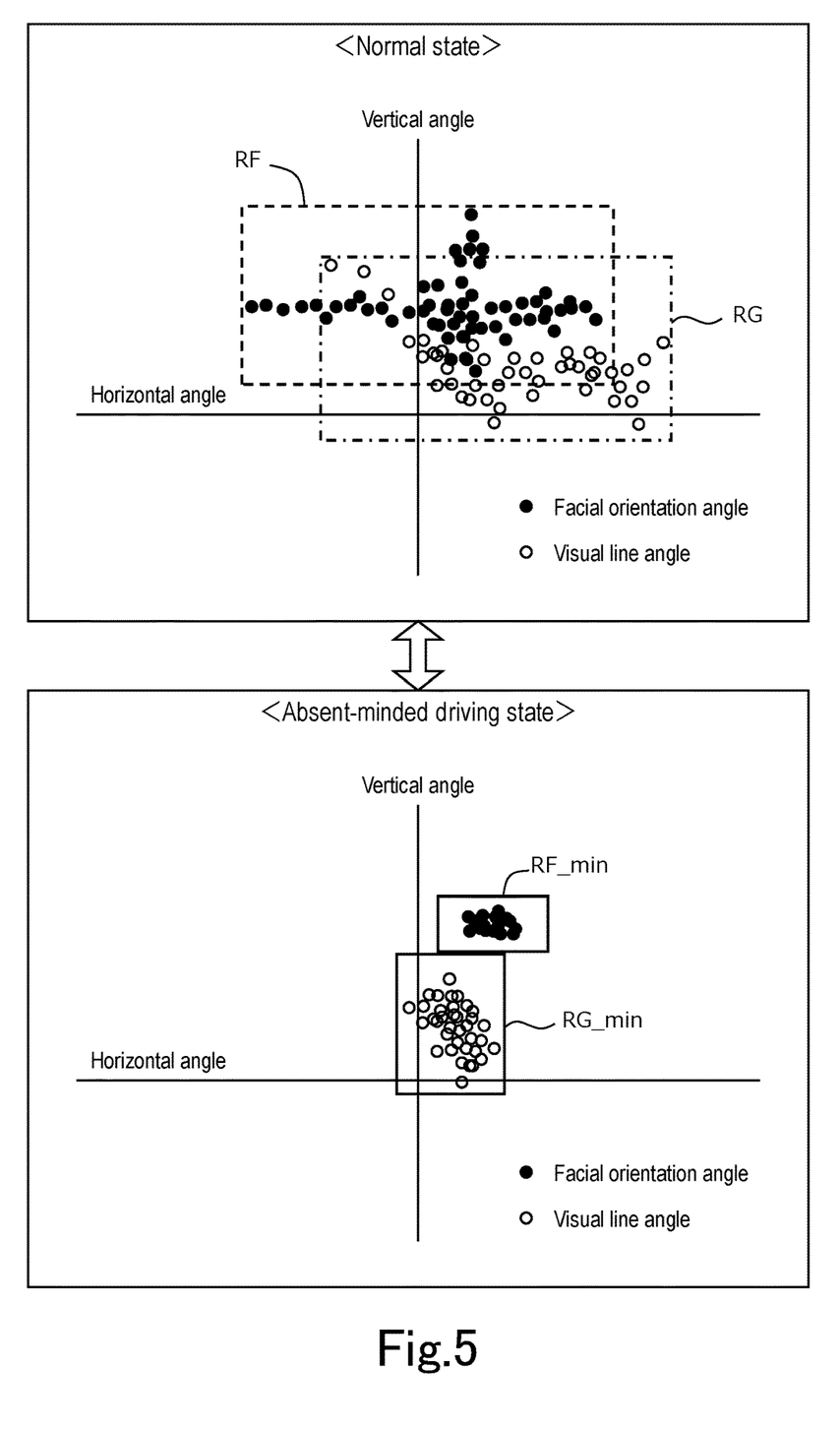
FIG. 5 is a diagram illustrating a method of detecting absent-minded driving.

FIG. 5 shows distribution diagrams showing how the driver's face orientation and visual line of sight moved within a certain period of time. The distribution diagram on the upper side is made from the data in the normal state, and the distribution diagram on the lower side is made from the data in the absent-minded driving state. In each distribution diagram, black circles indicate a facial orientation angle, white circles indicate a visual line angle. Further, in each distribution diagram, the vertical axis is a vertical angle, the horizontal axis is a horizontal angle.

As is evident from the comparison of the upper and lower distribution diagrams, in the distribution diagram of the absent-minded driving state, the distribution range in which the face orientation angle is distributed is narrower than the distribution range in the normal state, and the distribution range in which the visual line angle is distributed is also narrower than the distribution range in the normal state. From this fact, it is considered that the driver's state can be distinguished between the normal state and the absent-minded driving state by examining the distribution range of the face orientation angle and the distribution range of the visual line angle.

The absent-minded driving detection program 56c processes the driver state information 56a acquired by the driver monitor 20, and collects the data of the face orientation angle and the data of the visual line angle in a predetermined period of time, for example, about 30 seconds. Then, the absent-minded driving detection program 56c calculates the distribution range RF in which the face orientation angle is distributed and the distribution range RG in which the visual line angle is distributed.

A threshold range RF_min is set to the distribution range RF of the face orientation angle. A threshold range RG_min is also set to the distribution range RG of the visual line angle. The threshold range RF_min and the threshold range RG_min are determined on the basis of data obtained in the absent-minded driving. When the distribution range RF of the face orientation angle falls within the threshold range RF_min and the distribution range RG of the visual line angle falls within the threshold range RG_min, the absent-minded driving detection program 56c determines that the state of the driver is the absent-minded driving state. By this determination, the absent-minded driving is detected.

5. Driver Assistance Processing

The driver assistance system 100 executes driver assistance processing for assisting the driver so that the driver can maintain driving in a suitable state. More specifically, the driver assistance processing by the driver assistance system 100 is processing for returning the driver whose wakefulness has reduced during autonomous driving of the vehicle 10 or the driver who is in the absent-minded driving state to the state suitable for driving. The driver assistance processing by the driver assistance system 100 is realized by executing the driver assistance program 56e by the processor 52. Hereinafter, the procedure of the driver assistance processing by the driver assistance program 56e will be described with reference to flowcharts of FIGS. 6 and 7.

Figure 6:
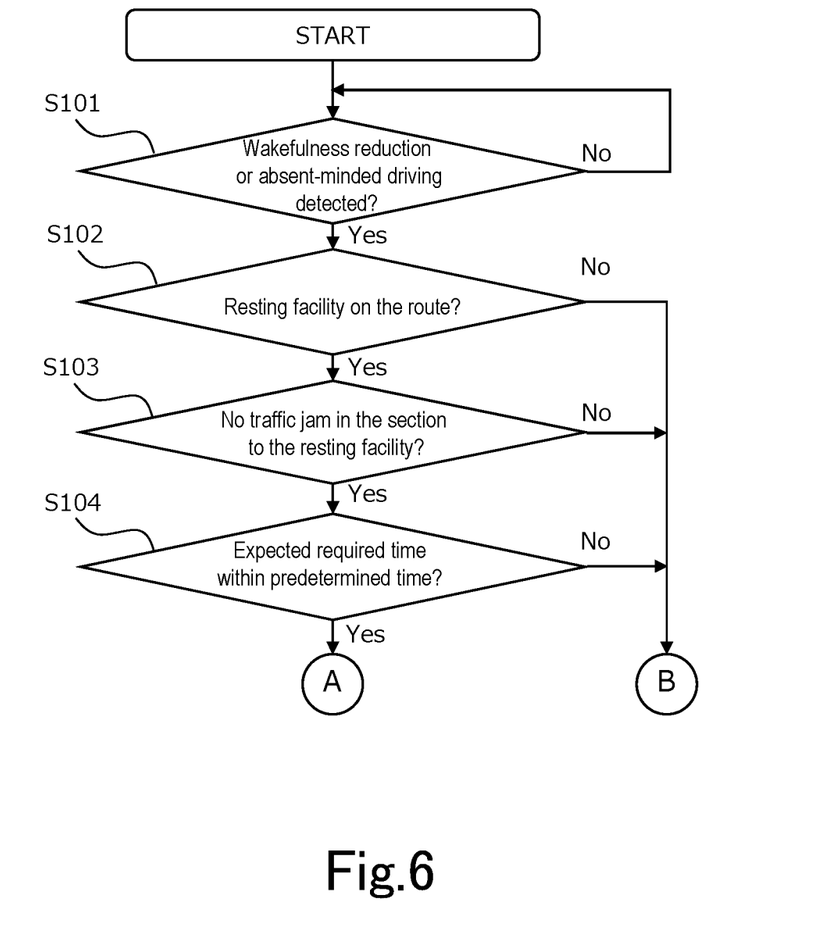
FIG. 6 is a flowchart showing a procedure of driver assistance processing by the driver assistance system according to the present embodiment.

The driver assistance program 56e is executed from the processing shown in the flowchart of FIG. 6. In step S101 of the flowchart of FIG. 6, it is determined whether or not the wakefulness reduction or the absent-minded driving has been detected. The wakefulness reduction is detected by the above-mentioned wakefulness reduction detection program 56b. The absent-minded driving is detected by the above-mentioned absent-minded driving detection program 56c. The determination of the step S101 is repeatedly executed periodically until the wakefulness reduction or the absent-minded driving is detected.

If the wakefulness reduction or the absent-minded driving is detected, the procedure proceeds to step S102. When the wakefulness of the driver has reduced or when the driver is in the absent-minded driving state, the driver can be returned to the state suitable for driving if the driver can rest at a resting facility. Therefore, when the wakefulness reduction or the absent-minded driving is detected, the first thing to be done is to search for a resting facility on the route to the destination.

In the step S102, the navigator 60 searches for a resting facility on the route to the destination from the map information 56d. If there is no resting facility on the route to the destination, or if the nearest resting facility itself is the destination, the driver cannot rest at a resting facility. In this event, the procedure proceeds to step S204 of the flowchart of FIG. 7, which will be described later.

If there is a resting facility on the route to the destination, the procedure proceeds to step S103. In the step S103, it is determined by the navigator 60 whether or not a traffic jam occurs in the section to the resting facility. Information on the presence or absence of a traffic jam can be acquired from a road traffic information communication system. If a traffic jam occurs in the section to the resting facility, it is better to refrain from proposing the driver to visit the resting facility. It is undeniable that the driver's awareness of the occurrence of a traffic jam may have an adverse effect on the driver by eliminating the feeling of enduring until the vehicle arrives at the resting facility. Therefore, when a traffic jam occurs in the section to the resting facility, the procedure proceeds to the step S204 of the flowchart of FIG. 7, which will be described later.

If a traffic jam does not occur in the section to the resting facility, the procedure proceeds to step S104. In the step S104, an expected required time to the resting facility is calculated by the navigator 60. The expected required time is calculated using information including the speed of the vehicle 10 and the distance to the resting facility. If it seems to take too much time to arrive at the resting facility, it is better to refrain from proposing to the driver to visit the resting facility. It is undeniable that the driver's awareness of the expected required time may have an adverse effect on the driver by eliminating the feeling of enduring until the vehicle arrives at the resting facility. Therefore, when the expected required time to the resting facility exceeds a predetermined time, the procedure proceeds to the step S204 of the flowchart of FIG. 7, which will be described later.

Figure 7:
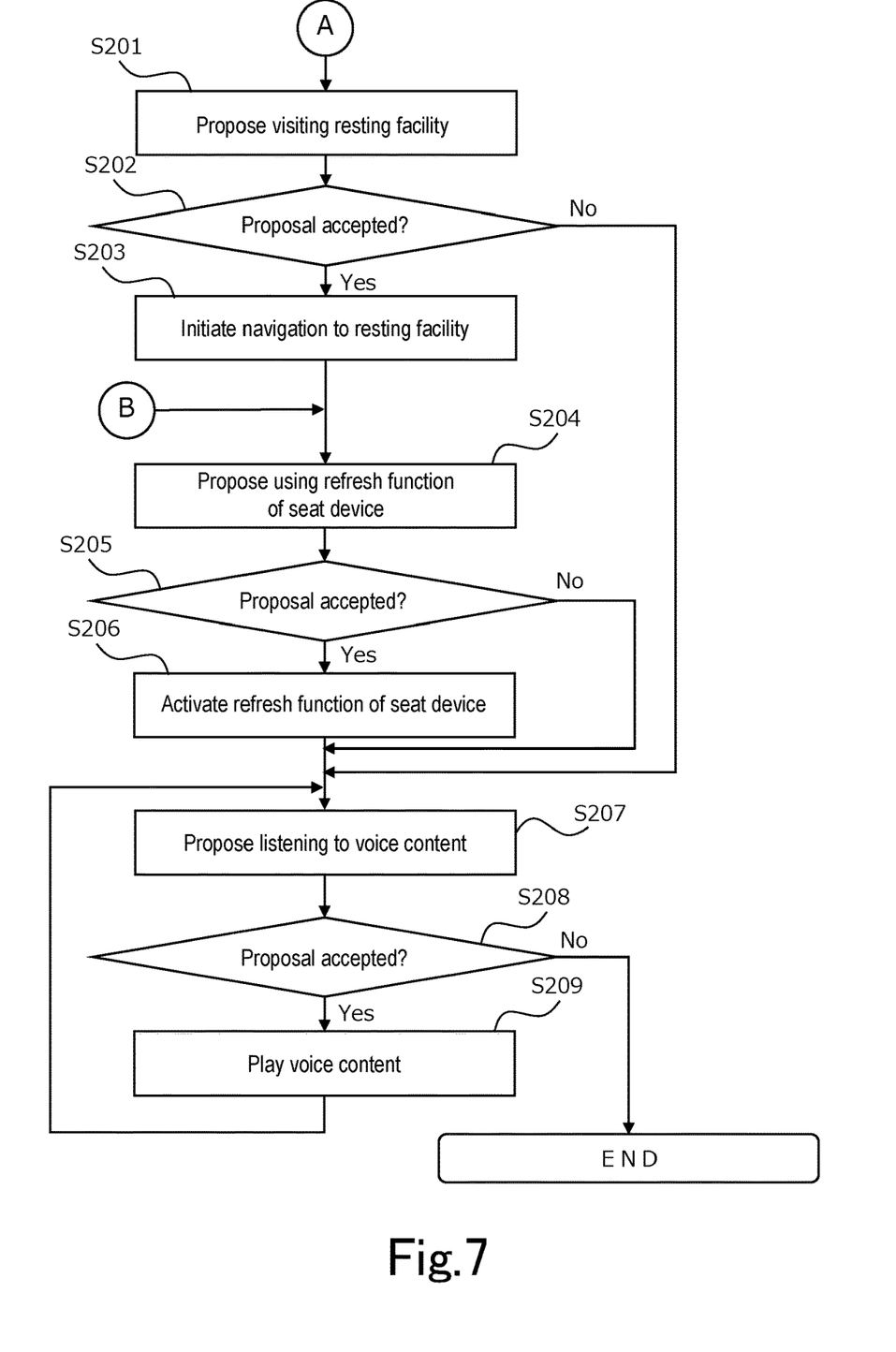
FIG. 7 is a flowchart showing a procedure of the driver assistance processing by the driver assistance system according to the present embodiment.

When the expected required time to the resting facility falls within the predetermined time, the driver assistance program 56e executes the processing shown in the flowchart of FIG. 7 from step S201. In the step S201, the HMI unit 30 proposes to the driver to visit the resting facility. The proposal is made in voice interaction. For example, the HMI unit 30 voices the following proposal to the driver from the speaker 31.

HMI unit 30: "Excuse me while you are traveling. Aren't you getting tired? There is XYZ service area ahead of you. Would you like to visit there?"

In step S202, it is determined whether the proposal made in the step S201 is accepted or not. When the proposal made in the step S201 is accepted, that is, when the driver replies "yes" to the microphone 32, the procedure proceeds to step S203. In the step S203, the HMI unit 30 voices the following message to the driver from the speaker 31.

HMI unit 30: "Added to destination. Please travel according to actual traffic regulations."

Then, in the step S203, the navigator 60 adds the resting facility to the destinations (en-route point), and navigation to the resting facility is initiated. The vehicle 10 automatically travels to the resting facility according to the navigation by the navigator 60.

On the other hand, when the proposal made in the step S201 is rejected, that is, when the driver replies "No" to the microphone 32 in response to the proposal, the HMI unit 30 voices the following message to the driver from the speaker 31.

HMI unit 30: "Thank you. Please continue to travel carefully."

After the navigation to the resting facility by the navigator 60 is initiated, the procedure proceeds to the step S204. As described above, if there is no resting facility on the route, the steps S201 to S203 are skipped, and the procedure proceeds to the step S204. Even if there is a resting facility, the procedure also proceeds to the step S204 when a traffic jam occurs in the section to the resting facility, or when the expected required time to the resting facility exceeds the predetermined time.

In the step S204, the use of the refresh function of the seat device 40 is proposed from the HMI unit 30 to the driver. The proposal is made in voice interaction. For example, the HMI unit 30 voices the following proposal to the driver from the speaker 31.

The HMI unit 30: "Would you like to use a refresh sheet for a while?"

In step S205, it is determined whether the proposal made in the step S204 is accepted or not. When the proposal made in the step S204 is accepted, that is, when the driver replies "yes" to the microphone 32, the procedure proceeds to step S206. In the step S206, the HMI unit 30 voices the following message to the driver from the speaker 31.

The HMI unit 30: "Activate the refresh sheet. If you change the mode from the setting, you can change the refreshing part, that is upper body, waist and so on, and you can change the strength."

In the step S206, the refresh function of the seat device 40 is activated after the message flows from the speaker 31. The refresh function of the seat device 40 applies vibration stimulation to the driver, and the effect of the stimulation contributes to maintaining the wakefulness and the attention of the driver. Also, the refresh function of the seat device 40 continues to operate continuously or intermittently until the vehicle 10 arrives at the resting facility or destination.

On the other hand, when the proposal made in the step S204 is rejected, that is, when the driver replies "No" to the microphone 32 in response to the proposal, the HMI unit 30 voices the following message to the driver from the speaker 31.

HMI unit 30: "Thank you. Please continue to travel carefully."

After the refresh function of the seat device 40 is activated, the procedure proceeds to step S207. When the proposal to use the refresh function of the seat device 40 is rejected, or when the proposal to visit a resting facility is rejected, the procedure also proceeds to the step S207.

In the step S207, it is proposed to listen to the voice content 56f from the HMI unit 30. The voice content 56f is randomly selected. However, for example, it is allowed for the driver to arbitrarily select to listen to news or trivia. In the following example, trivia is proposed as the voice content 56f.

The proposal from the HMI unit 30 is made in voice interaction. For example, the HMI unit 30 voices the following proposal to the driver from the speaker 31.

HMI Unit 30: "Would you like to listen to trivia about transportation?"

In step S208, it is determined whether the proposal made in the step S207 is accepted or not. When the proposal made in the step S207 is accepted, that is, when the driver replies "yes" to the microphone 32, the procedure proceeds to step S209. In the step S209, the HMI unit 30 plays, for example, the following voice content 56f from the speaker 31.

The HMI unit 30: "The bar of the ETC gate is an expensive item with about 60,000 yen per bar. When passing through the gate, please keep the speed."

The voice content 56f played from the speaker 31 applies informational stimulation to the driver, and the effect of the stimulation contributes to maintaining the wakefulness and the attention of the driver.

On the other hand, when the proposal made in the step S207 is rejected, that is, when the driver replies "No" to the microphone 32 in response to the proposal, the HMI unit 30 voices the following message to the driver from the speaker 31.

HMI unit 30: "Thank you. Have a nice day."

After playing the voice content 56f, the procedure progresses to the step S207 again. In the step S207, it is again proposed to listen to the voice content 56f from the HMI unit 30. For example, the HMI unit 30 voices the following proposal to the driver from the speaker 31.

HMI Unit 30: "That's all trivia. Would you like to listen more?"

From the HMI unit 30, listening to the voice content 56f is proposed repeatedly in voice interaction until the driver rejects the proposal. The voice interaction itself stimulates the driver and has the effect of maintaining the wakefulness of the driver. By repeating this continuously or intermittently, the wakefulness reduction or the absent-minded driving is prevented from progressing.

Further, the stimulation received when the driver listens to the voice content 56f increases as the driver's interest in the voice content 56f increases. The voice content 56f played from the speaker 31 is changed to a new content every time a new proposal is made. This will apply new stimulation to the driver each time.

When the vehicle 10 arrives at the resting facility or destination, the proposal from the HMI unit 30 for the voice content 56f ends. When the vehicle 10 arrives at the resting facility or the destination, the refresh function of the seat device 40 is also deactivated.

6. Modified Example

When the wakefulness reduction or the absent-minded driving is detected, stimulation by light may be applied to the driver. Stimulation by light can be applied, for example, by flashing the HUD 33. In addition, when the wakefulness reduction or the absent-minded driving is detected, vibration stimulation may be applied to the driver by vibrating the seat belt.

In addition, in spite of the execution of the above-mentioned driver assistance processing, when the wakefulness reduction of the driver progresses, it is allowed to detect that the eyes have been closed for a certain period of time or the driving posture has collapsed, and to give a warning by a buzzer sound or the like. Furthermore, if the driver does not return to the state suitable for driving even if the warning is given, the autonomous driving mode may be terminated, or the vehicle 10 may be evacuated to a road shoulder by the autonomous driving.

The driver assistance system according to the present disclosure can be applied to not only the autonomous driving vehicle such as the vehicle 10 of the above embodiment but also a manual driving vehicle driven by an operation of a driver.

What is claimed is:

1. A driver assistance system comprising:
   a navigation device configured to automatically navigate a vehicle based on map information and to search for a resting facility on a route from the map information; and
   a voice interaction device configured to automatically determine whether a predetermined condition exists, and when the predetermined condition exists, to automatically interact with a driver by voice and to execute a first interaction of proposing navigation to the resting facility by the navigation device, and
   a stimulation device configured to continuously or intermittently apply stimulation to the driver,
   wherein the voice interaction device is configured to refrain from executing the first interaction when a traffic jam occurs in a section to the resting facility;
   wherein the voice interaction device is configured to execute a second interaction of proposing application of stimulation by the stimulation device; and
   wherein the stimulation device is configured to apply vibration stimulation to the driver.

2. The driver assistance system according to claim 1, wherein the voice interaction device is configured to propose application of a plurality of types of stimulation to the driver in the second interaction.

3. The driver assistance system according to claim 1, wherein the stimulation device is configured to apply informational stimulation to the driver.

4. A driver assistance method, comprising:
   automatically navigating a vehicle based on map information,
   searching for a resting facility on a route from map information;
   automatically determine whether a predetermined condition exists, and when the predetermined condition exists, automatically executing a first interaction by voice with a driver to propose navigation to the resting facility;
   refraining from executing the first interaction when a traffic jam occurs in a section to the resting facility;
   proposing application of stimulation by a stimulation device; and
   applying vibration stimulation to the driver by the stimulation device.

* * * * *